United States Patent
Friedmann

(10) Patent No.: US 7,147,092 B2
(45) Date of Patent: Dec. 12, 2006

(54) MULTIPLE CLUTCH UNIT

(75) Inventor: Oswald Friedmann, Lichtenau (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/817,457

(22) Filed: Apr. 3, 2004

(65) Prior Publication Data

US 2005/0000774 A1    Jan. 6, 2005

(30) Foreign Application Priority Data

Apr. 4, 2003   (DE) ............................. 103 15 393

(51) Int. Cl.
     *F16D 21/00*  (2006.01)
(52) U.S. Cl. ................ 192/48.91; 192/87.11; 192/85 CA
(58) Field of Classification Search .............. 192/48.8, 192/48.9, 85 AA, 85 CA, 212
     See application file for complete search history.

(56) References Cited

U.S. PATENT DOCUMENTS

| | | | | |
|---|---|---|---|---|
| 2,333,037 A | * | 10/1943 | Osborn ........................ | 74/330 |
| 2,687,198 A | * | 8/1954 | Greenlee ................ | 192/113.35 |
| 2,712,373 A | * | 7/1955 | Smirl ...................... | 192/103 F |
| 2,919,778 A | * | 1/1960 | Aschauer ..................... | 192/86 |
| 3,191,731 A | * | 6/1965 | Albert ....................... | 192/3.52 |
| 3,589,483 A | * | 6/1971 | Smith ........................ | 192/3.52 |
| 4,732,253 A | * | 3/1988 | Hiramatsu et al. ........ | 192/87.11 |
| 6,401,894 B1 | * | 6/2002 | Merkel et al. ............. | 192/48.9 |
| 6,622,839 B1 | * | 9/2003 | Kundermann et al. ..... | 192/48.9 |
| 6,722,483 B1 | * | 4/2004 | Damm et al. .............. | 192/48.8 |

FOREIGN PATENT DOCUMENTS

GB            594950 A   *  11/1947

OTHER PUBLICATIONS

International Search Report, EP1464859, Apr. 2005.*

* cited by examiner

*Primary Examiner*—Saul Rodriguez
(74) *Attorney, Agent, or Firm*—Alfred J. Mangels

(57) ABSTRACT

A multiple clutch unit for a power train. The clutch includes a first clutch, particularly a multiple-disk clutch that is non-rotatably connected to a first shaft. A second clutch, particularly a multiple-disk clutch, is non-rotatably connected to a second shaft and is arranged coaxially with the first clutch. The clutches can be actuated by means of piston/cylinder units, particularly hydraulically. The piston/cylinder unit associated with the first clutch includes a substantially cup-shaped cylinder that is connected to and cooperates with the first shaft in a non-rotatable but axially movable manner.

15 Claims, 1 Drawing Sheet

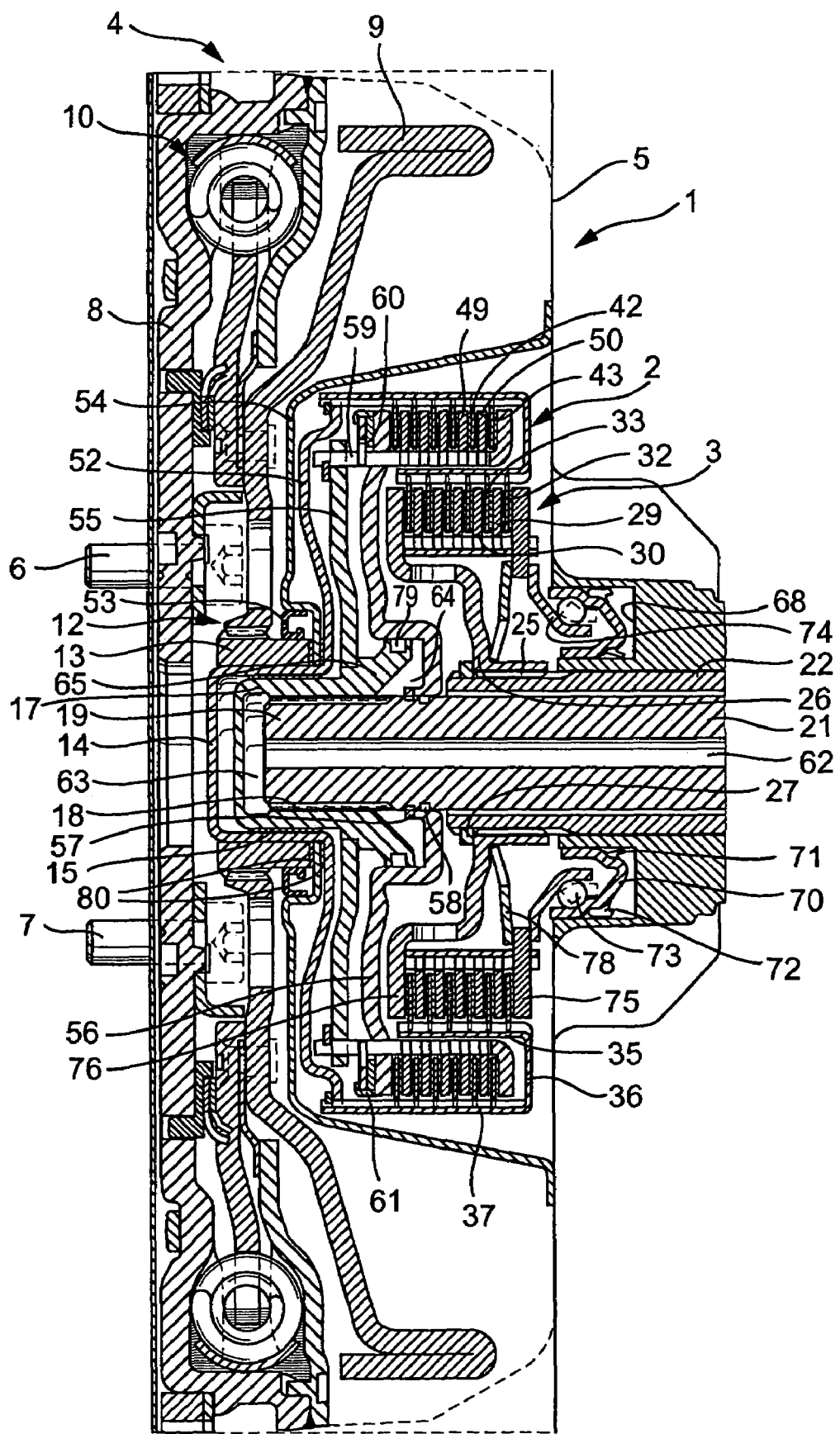

MULTIPLE CLUTCH UNIT

BACKGROUND OF THE INVENTION

1. Field of the Invention

The invention relates to a multiple clutch unit for a power train and having a first clutch, particularly a multiple-disk clutch, that is non-rotatably connected to a first shaft, and having at least a second clutch, particularly a multiple-disk clutch, that is non-rotatably connected to a second shaft and is arranged coaxially with the first clutch, whereby the clutches can be actuated by means of piston/cylinder units, particularly hydraulically.

2. Description of the Related Art

Conventional multiple clutch units are often constructed in a complicated manner, leading to relatively high manufacturing and assembly costs.

Accordingly, an object of the invention is to produce a multiple clutch unit for a power train, wherein the clutch unit can be simply constructed and cost-effectively manufactured and has a first clutch, particularly a multiple-disk clutch, that is non-rotatably connected to a first shaft, and has at least a second clutch, particularly a multiple-disk clutch, which is non-rotatably connected to a second shaft and is arranged coaxially with the first clutch, whereby the clutches can be actuated by means of piston/cylinder units, particularly hydraulically.

SUMMARY OF THE INVENTION

The object is achieved by a multiple clutch unit for a power train and having a first clutch, particularly a multiple-disk clutch, that is non-rotatably connected to a first shaft, and having at least a second clutch, particularly a multiple-disk clutch, that is non-rotatably connected to a second shaft and is arranged coaxially with the first clutch, whereby the clutches can be actuated by means of piston/cylinder units, particularly hydraulically. One of the piston/cylinder units, particularly the piston/cylinder unit associated with the first clutch, includes a substantially cup-shaped cylinder, which is connected to and/or cooperates with one of the shafts, particularly the first shaft, in a non-rotatable but axially movable manner. The end section of the shaft constitutes a rotatably supported but axially fixed virtual piston. The inner space of the cup-shaped cylinder constitutes a working chamber that is bounded by the end face of the shaft, which is substantially in the form of a circular cylinder. When the pressure in the working space increases, the cup-shaped cylinder moves in an axial direction away from the shaft. In that way, operation of the associated clutch is made possible.

A preferred embodiment of the clutch unit is characterized in that the inner space of the cup-shaped cylinder can be pressurized by means of a throughbore in the associated shaft. The preferably central throughbore in the solid shaft provides a hydraulic or pneumatic connection between the inner space of the cylinder and a pressure source that can preferably be controlled and/or regulated. That provides the advantage that no additional conduits are required in order to provide a connection to the inner space of the cylinder.

A further preferred embodiment of the multiple clutch unit is characterized in that that the cup-shaped cylinder is connected to one of the shafts, in a non-rotatable but axially movable manner, particularly to the first shaft, by means of a positive locking connection, particularly a tooth system. The transfer of a torque from the cup-shaped cylinder to the shaft is ensured by the positive locking connection.

A further preferred embodiment of the multiple clutch unit is characterized in that that the cup-shaped cylinder is coupled to one of the clutches, particularly to inner radial disks of the first clutch, by means of a cylinder coupling element. The cylinder coupling element serves to transfer the torque from the cup-shaped cylinder to the associated clutch.

A further preferred embodiment of the multiple clutch unit is characterized in that that a shaft coupling element, which is axially rigidly connected to the associated clutch, particularly to inner radial disks of the first clutch, is axially rigidly arranged on the shaft, particularly on the first shaft. The shaft coupling element constitutes an abutment for the associated clutch disks.

A further preferred embodiment of the multiple clutch unit is characterized in that that a pressure-receiving chamber is formed between one part of the shaft coupling element and a shoulder of the cup-shaped cylinder and is connected to the inner space of the cylinder, particularly through the positive connection between the cylinder and the associated shaft. The pressure-receiving chamber, in practical terms, thus constitutes a second working chamber that is connected to the first working chamber. Both working chambers or cylinders, together with the respective piston or pistons, serve to operate one of the clutches, particularly the first clutch.

A further preferred embodiment of the multiple clutch unit is characterized in that that a transmission input element is rotatably supported on the outer peripheral surface of the cup-shaped cylinder and is non-rotatably connected to both the first and second clutches, particularly to outer radial disks of the first and the second clutches. By means of the non-rotatable connection between the transmission input element and the clutches, it becomes possible to transmit a torque provided by an internal combustion engine, for example, to the first or the second shaft. The first shaft can serve, for example, to implement the first, third, and fifth gears, and the second shaft can serve to implement the second, fourth, and if applicable, sixth gears.

A further preferred embodiment of the multiple clutch unit is characterized in that that the outer radial disks of the first and the second clutches are each non-rotatably connected by tooth systems to one leg of a disk connection element, which has a substantially U-shaped cross section and is coupled to the transmission input element. The disk connection element can be cost-effectively manufactured as a sheet metal member.

A further preferred embodiment of the multiple clutch unit is characterized in that that a substantially annular chamber for one of the clutches, particularly the first clutch, is formed in the interior of the U-shaped disk connection element. In that way, a compact structure of the multiple clutch unit is ensured.

A further preferred embodiment of the multiple clutch unit is characterized in that that the other of the piston/cylinder units, particularly the piston/cylinder unit associated with the second clutch, includes a rigid cylinder that cooperates with an axially-displaceable piston element, which is coupled to an actuation element for the associated clutch by the interposition of a bearing unit. In that way, a simple, compact arrangement of the associated clutch is ensured.

A further preferred embodiment of the multiple clutch unit is characterized in that that the second shaft is formed as a hollow shaft that encloses the first shaft. In that way, the structure of the multiple clutch unit is simplified.

A further preferred embodiment of the multiple clutch unit is characterized in that that a torsional vibration damper is in series with the two clutches. The torsional vibration damper serves to dampen torsional vibrations occurring in the operation of the multiple clutch unit. The torsional vibration damper is preferably formed as a divided flywheel.

In a transmission system for use in motor vehicles, for example, the above-identified object is achieved by the use of a multiple clutch unit as described above.

BRIEF DESCRIPTION OF THE DRAWING

The structure, operation, and advantages of the present invention will become further apparent upon consideration of the following description, taken in conjunction with the accompanying drawing in which FIG. 1 is a side elevational view, in cross section, of an embodiment of a multiple clutch unit in accordance with the present invention.

DESCRIPTION OF THE PREFERRED EMBODIMENTS

FIG. 1 shows in cross section an embodiment of a multiple clutch unit 1 that is positioned between an internal combustion engine and a transmission system (neither of which is shown in detail). Multiple clutch unit 1 includes a first multiple-disk clutch 2 and a second multiple-disk clutch 3. Connected in series with both multiple-disk clutches 2 and 3, on the side associated with the internal combustion engine (not shown), is a torsional vibration damper 4. Both multiple-disk clutches 2 and 3 and the torsional vibration damper 4 are accommodated in a common housing 5.

The torsional vibration damper 4 is formed as a divided flywheel that has a first or primary flywheel mass 8 as well as a second or secondary flywheel mass 9 and can be connected by means of fastening screws 6, 7 to an output shaft (not shown) of an internal combustion engine. Both flywheel masses 8, 9 are rotatably supported relative to each other. A damping unit 10 operates between the two flywheel masses 8, 9 and includes energy storage devices, at least one of which is in the form of helical compression springs. The structure and function of the torsional vibration damper 4 are presumed to be known and are therefore not further described herein.

The secondary flywheel mass 9 is non-rotatably connected to a transmission input element 13 by a tooth system 12. The torque supplied by the internal combustion engine (not shown) is conveyed to the transmission input element 13 by the tooth system 12. The transmission input element 13 is of annular form with a substantially rectangular cross section. An essentially cup-shaped bearing shell 14 is fastened radially inwardly of the transmission input element 13 and serves to rotatably support the transmission input element 13.

The cup-shaped bearing shell 14 of the transmission input element 13 is rotatably supported on a substantially cup-shaped cylinder 17 by a journal bearing 15. The cylinder 17 is formed substantially as a circular cylinder that is closed on one side by a cover or bottom.

The cup-shaped cylinder 17 is non-rotatably connected to the end section 19 of a first shaft 21 by a tooth system 18. The first shaft 21 is arranged coaxially within a second shaft 22 that is formed as a hollow shaft. The first shaft 21 can be coupled to the output shaft (not shown) of an internal combustion engine by the first clutch 2. The second shaft 22, formed as a hollow shaft, can be coupled to the output shaft (not shown) of an internal combustion engine by the second clutch 3.

The second shaft 22 is non-rotatably connected to a shaft coupling element 26 by a tooth system 25. Movement of shaft coupling element 26 in an axial direction toward the end section 19 of the first shaft 21 is limited by a retaining ring 27. The shaft coupling element 26 produces a non-rotatable connection between the second shaft 22 and the inner radial disks 29, 30 of the second clutch 3. The outer radial disks 32, 33 of the second clutch 3 are non-rotatably connected by a tooth system to one leg 35 of a disk connection element 36 that has a substantially U-shaped cross section. The second leg 37 of the disk connection element 36 is non-rotatably connected to the outer radial disks 42, 43 of the first clutch 2 by a tooth system. The disk connection element 36 forms an annular space between the parallel legs 35 and 37, within which the first multiple-disk clutch 2 is received.

When in an engaged condition, the outer radial disks 42, 43 of the first clutch 2 cooperate with inner radial disks 49, 50 to transfer a torque from the output shaft (not shown) of an internal combustion engine to the first shaft 21. When in a disengaged condition, the outer radial disks 42, 43 of the first clutch 2 can rotate relative to the inner radial disks 49, 50. In the disengaged condition no torque is transmitted.

The outer radial leg 37 of the disk connection element 36 is coupled to the cup-shaped bearing shell 14 and the transmission input element 13 by a carrier plate 52. The carrier plate 52 extends in a substantially radial direction and is integrally formed with the cup-shaped bearing shell 14. In operation, a torque is transmitted by the carrier plate 52 from the transmission input element 13 to the disk connection element 36 and to the non-rotatably-connected outer radial disks 42, 43; 32, 33 of the two clutches 3, 2.

A shaft seal 53 is positioned between the transmission input element 13 and a cover plate 54. The cover plate 54 is radially outwardly secured to the housing 5 and serves to separately enclose the clutches 2, 3 in housing 5.

A cylinder coupling element 55 extends in a radial direction from the cylinder 17 to the first clutch 2. The cylinder 17 is rigidly connected by the cylinder coupling element 55 to a carrier arm 59, on which the inner radial disks 49, 50 of the first clutch 2 are mounted. An axial movement of the cylinder 17 is transmitted to the inner radial disks 49, 50 of the first clutch 2 by the cylinder coupling element 55.

A shaft coupling element 56 is axially rigidly attached to the first shaft 21 by a retaining ring 57. The shaft coupling element 56 is prevented from moving to the end section 19 of the shaft 21 by the retaining ring 57. A sealing ring 58 is arranged between the shaft coupling element 56 and the outer peripheral surface of the first shaft 21 and is only statically loaded when the multiple clutch unit is in operation.

The carrier arm 59, to which the inner radial disks 49, 50 of the first clutch 2 are attached, is movable in an axial direction relative to the shaft coupling element 56. At its free end the shaft coupling element 56 constitutes an abutment for the disks of the first clutch 2 when the carrier arm 59 is moved toward the internal combustion engine (not shown).

A restoring disk spring 60, which is coupled to the shaft coupling element 56 with the aid of a hook 61, ensures that the carrier arm 59, with the disks of the first clutch 2 attached thereto, moves back to the right after the actuation of the clutch. The restoring disk spring 60 thus produces a restoration of the carrier arm 59, and the inner radial disks 49, 50 attached thereto, to the first clutch 2.

A central throughbore 62 is provided in the first shaft, which serves to pressurize the working chamber 63 located on the inside of the cylinder 17. The working chamber 63 is connected to a working chamber 64 by means of the tooth system 18 between the cylinder 17 and the end section 19 of the first shaft 21, which is formed between the extension 65 on the cylinder 17 and the shaft coupling element 56. That connection ensures that the identical pressure exists in the working chambers 63 and 64. An increase of the pressure in the working chambers 63 and 64 causes the cylinder 17, with the cylinder coupling element 55, to move away from the shaft coupling element 56. That causes the inner radial disks 49, 50 of the first clutch 2 to be brought into contact with the outer radial disks 42, 43 of the same clutch, so that a torque is transmitted from the transmission input element 13 to the first shaft 21. When the pressure in the working chambers 63 and 64 is released by means of a suitable valve device, the restoring disk spring 60 ensures that the contact between the inner radial disks 49, 50 and the outer radial disks 42, 43 of the first clutch 2 is released and the torque transmission is interrupted.

A working chamber 68 that forms a cylinder inner space for actuation of the second clutch 3 is recessed in the housing 5. The working chamber 68 can be pressurized through a pressure line (not shown). The working chamber 68 has the form of an annular space with a rectangular cross section. A substantially annular piston 70 is received in the working chamber 68 and includes two seals 71 and 72 that serve to seal the working chamber 68.

The piston 70 has a substantially U-shaped cross section, in which an operating bearing 73 is received. The bearing 73 serves to rotatably support an actuation ring 74 against the piston 70 in such a way that axial movement of the piston 70 is transmitted to the actuation ring 74. The end of the actuation ring 74 that is opposite from the bearing 73, when viewed in cross-section, is in contact with a pressure ring 75, which is movable in an axial direction. Arranged between the pressure ring 75 and a counterpressure ring 76, which is formed on the radially outer end of the shaft coupling element 26, are the disks 29, 30; 32, 33 of the second clutch 3.

When the pressure in the working chamber 68 increases, the piston 70, the actuation ring 74 coupled thereto, and the pressure ring 75, which is also coupled thereto, move toward the axially stationary shaft coupling element 26. In that way, the inner radial disks 29, 30 are pressed against the outer radial disks 32, 33 of the second clutch 3, so that a torque is transmitted from the transmission input element 13 to the second shaft 22.

When the pressure in the working chamber 68 decreases, a restoring spring 78, which is pre-stressed between the pressure ring 75 and the shaft coupling element 26, ensures that the pressure ring 75, the actuation ring 74 and the piston 70 are again moved away from the counterpressure ring 76. The restoring spring 78 thus ensures the restoration of the position of the piston 70.

The working chamber 64 is bounded on one side by the shaft coupling element 56 and on the other side by the extension 65 on the cylinder 17. The shaft coupling element 56 is axially stationary and the cylinder 17, with the extension 65, is axially movable. Arranged between the extension 65 of the cylinder 17 and the associated contact surface on the shaft coupling element 56 is a movable seal 79, which serves to seal the working chamber 64.

The cover plate 54 is radially outwardly supported on the housing 5. Radially inwardly between the cover plate 54 and the transmission input element 13, on one side, and the carrier plate 52 on the other side, are arranged check plates 80. The check plates 80 serve to fix the transmission input element 13 and the carrier plate 52 in an axial direction.

Both clutches 2, 3, which are arranged radially one above the other, are responsible for first, third, and fifth gears, and for second, fourth, and sixth gears, respectively. The clutch 2 for the inner shaft 21 is actuated by means of the rotating cylinder 17; the clutch for the outer shaft 22 is actuated by means of a stationary cylinder. The actuation piston/actuation cylinder 17 for the first shaft 21 has only one movable seal 79. Neither of the clutches 2, 3 imposes appreciable axial force on the crankshaft (not shown) of the internal combustion engine. The actuation force of the clutch 3 is supported by the hollow shaft 22. The operating bearing 73 of the hollow shaft clutch 3 is integrated into the actuation piston 70. The transmission input element 13 is centered on the actuation piston/actuation cylinder 17 and is axially guided on the cover plate 54. The cylinder 17 of the clutch 2 simultaneously serves as a hub with the inner tooth system 18. When the rotary connection with the inner shaft 21 is accomplished in a sealed manner, it is possible to activate both of the clutches 2, 3 hydrostatically—that is, without a constantly running pump.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A multiple clutch unit for a power transmission system, said clutch unit comprising: a first clutch non-rotatably connected to a first input shaft of a transmission; a second clutch non-rotatably connected to a second input shaft of the transmission and arranged coaxially with the first clutch; a first piston/cylinder unit for actuating the first clutch; a second piston/cylinder unit for actuating the second clutch; wherein the first piston/cylinder unit includes a substantially cup-shaped cylinder that is closed on one side by an end wall and that is non-rotatably and axially-movably connected with the first input shaft; wherein the cup-shaped cylinder bounds a first working chamber, and the first input shaft includes an axial throughbore that communicates with the first working chamber for conveying pressurizing fluid to and from the first working chamber.

2. A multiple clutch unit according to claim 1, wherein the cup-shaped cylinder is non-rotatably but axially-movably connected to the first shaft by a positive connection.

3. A multiple clutch unit according to claim 2, wherein the positive connection is a tooth system.

4. A multiple clutch unit according to claim 1, including a shaft coupling element connected in an axially fixed manner to the first shaft and operatively coupled with the first clutch.

5. A multiple clutch unit according to claim 4, including a second working chamber positioned between the shaft coupling element and the cup-shaped cylinder, wherein the second working chamber is in fluid communication with the first working chamber.

6. A multiple clutch unit according to claim 4, wherein the shaft coupling element is operatively connected with the inner radial disks of the first clutch.

7. A multiple clutch unit according to claim 5, wherein the communication between the first and second working chambers takes place through the positive connection between the cup-shaped cylinder and the first drive shaft.

8. A multiple clutch unit according to claim 1, wherein the second shaft is a hollow shaft that surrounds the first shaft.

9. A multiple clutch unit according to claim 1, including a torsional vibration damper connected upstream of the first and second clutches, relative to a positive power flow direction through the clutch unit.

10. A multiple clutch unit according to claim 1, wherein the first and second clutches are multiple-disk clutches.

11. A multiple clutch unit according to claim 1, including a transmission input element rotatably carried on an outer circumferential surface of the cup-shaped cylinder, wherein the transmission input element is non-rotatably connected to both the first clutch and the second clutch; wherein the transmission element is operatively connected with outer radially-extending disks carried by each of the first and second clutches.

12. A multiple clutch unit for a power transmission system, said clutch unit comprising: a first clutch non-rotatably connected to a first input shaft of a transmission; a second clutch non-rotatably connected to a second input shaft of the transmission and arranged coaxially with the first clutch; a first piston/cylinder unit for actuating the first clutch; a second piston/cylinder unit for actuating the second clutch; wherein the first piston/cylinder unit includes a substantially cup-shaped cylinder that is closed on one side by an end wall and that is non-rotatably and axially-movably connected with the first input shaft; and a cylinder coupling element, wherein the first clutch includes a plurality of axially-spaced, radially-extending inner disks and a plurality of axially-spaced, radially-extending outer disks, and wherein the cup-shaped cylinder is operatively coupled with the inner radial disks of the first clutch by the cylinder coupling element.

13. A multiple clutch unit for a power transmission system, said clutch unit comprising: a first clutch non-rotatably connected to a first shaft; a second clutch non-rotatably connected to a second shaft and arranged coaxially with the first clutch; a first piston/cylinder unit for actuating the first clutch; a second piston/cylinder unit for actuating the second clutch; wherein the first piston/cylinder unit includes a substantially cup-shaped cylinder that is non-rotatably and axially-movably connected with the first shaft; a transmission input element rotatably carried on an outer circumferential surface of the cup-shaped cylinder, wherein the transmission input element is non-rotatably connected to both the first clutch and the second clutch; and a disk connection element having a substantially U-shaped cross section and operatively coupled with the transmission input element; wherein each of the first and second clutches includes respective outer radial disks, and wherein each of the outer radial disks of the first and the second clutch is non-rotatably connected by a tooth system to a leg of the disk connection element.

14. A multiple clutch unit according to claim 13, wherein the U-shaped disk connection element defines a substantially annular inner space for receiving disks of the first clutch.

15. A multiple clutch unit for a power transmission system, said clutch unit comprising: a first clutch non-rotatably connected to a first input shaft of a transmission; a second clutch non-rotatably connected to a second input shaft of the transmission and arranged coaxially with the first clutch; a first piston/cylinder unit for actuating the first clutch; a second piston/cylinder unit for actuating the second clutch; wherein the first piston/cylinder unit includes a substantially cup-shaped cylinder that is closed on one side by an end wall and that is non-rotatably and axially-movably connected with the first input shaft; wherein the second piston/cylinder unit includes an axially fixed cylinder and an axially displaceable piston element received within the axially fixed cylinder, and wherein the displaceable piston includes a bearing device for coupling the second clutch with a clutch actuation element.

* * * * *